US009368154B2

(12) United States Patent
Sato

(10) Patent No.: US 9,368,154 B2
(45) Date of Patent: Jun. 14, 2016

(54) LIBRARY DEVICE, CONTROL METHOD THEREFOR, AND LIBRARY CONTROL DEVICE

(71) Applicant: NEC PLATFORMS, LTD., Kawasaki-shi, Kanagawa (JP)

(72) Inventor: Shin Sato, Tokyo (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 14/419,117

(22) PCT Filed: Jul. 31, 2013

(86) PCT No.: PCT/JP2013/070724
§ 371 (c)(1),
(2) Date: Feb. 2, 2015

(87) PCT Pub. No.: WO2014/021373
PCT Pub. Date: Feb. 6, 2014

(65) Prior Publication Data
US 2015/0194183 A1    Jul. 9, 2015

(30) Foreign Application Priority Data
Aug. 3, 2012   (JP) ................................. 2012-172707

(51) Int. Cl.
*G06F 7/00*       (2006.01)
*G11B 27/00*      (2006.01)
*G11B 15/68*      (2006.01)
*G11B 17/22*      (2006.01)

(52) U.S. Cl.
CPC ............ *G11B 27/002* (2013.01); *G11B 15/689* (2013.01); *G11B 15/6835* (2013.01); *G11B 15/6885* (2013.01); *G11B 17/225* (2013.01); *G11B 17/228* (2013.01)

(58) Field of Classification Search
USPC ......................................................... 700/214
See application file for complete search history.

(56) References Cited

U.S. PATENT DOCUMENTS

| 8,265,786 B2 * | 9/2012 | Jesionowski ......... G11B 15/689 700/214 |
| 2007/0211366 A1* | 9/2007 | Chamorro ............ G11B 15/682 360/69 |
| 2007/0217061 A1* | 9/2007 | Jesionowski ....... G11B 15/6835 360/92.1 |
| 2007/0230036 A1* | 10/2007 | Nave .................. G11B 23/0236 360/92.1 |

FOREIGN PATENT DOCUMENTS

| JP | 2011-146087 A | 7/2011 |
| JP | 2012-128901 A | 7/2012 |

OTHER PUBLICATIONS

International Search Report of PCT/JP2013/070724, dated Oct. 29, 2013. [PCT/ISA/210].

* cited by examiner

*Primary Examiner* — Kyle Logan
(74) *Attorney, Agent, or Firm* — Sughrue Mion, PLLC

(57) ABSTRACT

A library device includes: a recording medium storage unit that stores at least a first recording medium, and a second recording medium that is a take-out request target; an accessor that takes out the second recording medium from the recording medium storage unit after taking out the first recording medium from the recording medium storage unit; an evacuation destination drive device that receives the first recording medium taken out by the accessor; a take-out destination drive device that draws in the second recording medium taken out by the accessor; and an operation interruption control unit that performs a control that interrupts an operation of the evacuation destination drive drawing in the second recording medium taken in the evacuation destination drive device.

10 Claims, 5 Drawing Sheets

|  | CELL C(1) | CELL C(2) | CELL C(3) | ... |
|---|---|---|---|---|
| FRONT | RECORDING MEDIUM C | RECORDING MEDIUM B | RECORDING MEDIUM E | ... |
| REAR | RECORDING MEDIUM D | RECORDING MEDIUM A | RECORDING MEDIUM F | ... |

|  | USAGE | RECORDING MEDIUM IDENTIFICATION INFORMATION |
|---|---|---|
| DRIVE DEVICE 4 | NOT IN USE | ... |
| DRIVE DEVICE 5 | NOT IN USE | ... |

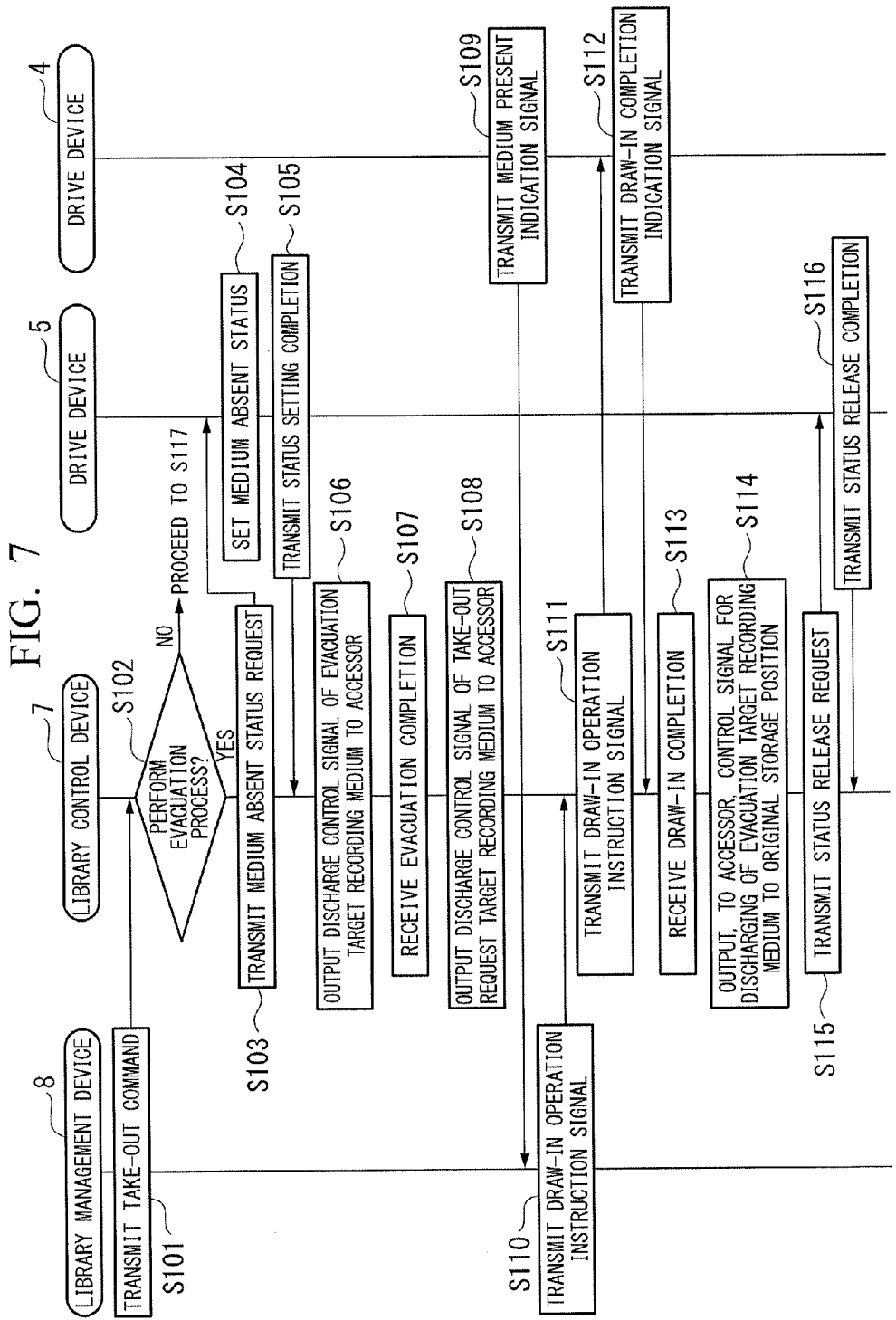

LIBRARY DEVICE, CONTROL METHOD THEREFOR, AND LIBRARY CONTROL DEVICE

CROSS REFERENCE TO RELATED APPLICATIONS

This application is a National Stage of International Application No. PCT/JP2013/070724 filed Jul. 31, 2013, claiming priority based on Japanese Patent Application No. 2012-172707, filed Aug. 3, 2012, the contents of all of which are incorporated herein by reference in their entirety.

TECHNICAL FIELD

The present invention relates to a library device including a recording medium storage unit which stores a plurality of memory media, a control method therefor, and a library control device.

BACKGROUND ART

Up until now, as an example of a library device, there has been known a deep-cell type library device (for example, refer to Patent Document 1). This deep-cell type library device includes a recording medium storage unit, a drive device, and an accessor mechanism. The recording medium storage unit stores a plurality of recording media (for example, data cartridges such as tapes and disks) in a manner of arranging them in the depth direction from the front side to the rear side. The drive device reads information recorded on the recording medium and writes information in the recording medium. The accessor mechanism takes a recording medium from the recording medium storage unit to the drive device, and takes a recording medium from the drive device to the recording medium storage unit. Moreover, the accessor mechanism pulls a recording medium from the drive device, and inserts a recording medium into the drive device.

PRIOR ART DOCUMENTS

Patent Document

[Patent Document 1] Japanese Unexamined Patent Application, First Publication No. 2011-146087

SUMMARY OF THE INVENTION

Problem to be Solved by the Invention

Here is described a case where a library device that employs an deep-cell type technique such as one described above receives a request from a server for taking out a recording medium stored in the rear of the recording medium storage unit, in order to read/write information. In this case, the library device performs a control such that a recording medium that is stored in front of the recording medium of the take-out request target is taken out first, and it is then taken to the front entrance of a drive device of its evacuation destination. Then, the library device performs a control such that the take-out target recording medium is taken out to a drive device that draws in and drives the recording medium. The library device transports and returns the recording medium, which has temporarily been evacuated to the front entrance of the evacuation destination drive device, to the original recording medium storage unit in this manner, and thereby it notifies a library management device of the server of the completion of the process of taking out the take-out target recording medium.

In the case where, in order to take out a rear recording medium, a recording medium that has been stored in front thereof is temporarily taken out to an evacuation destination drive device, the evacuation destination drive device may detect the recording medium that has been brought in and evacuated temporarily at the front entrance of the drive device itself in some cases. In this type of case, the drive device notifies the library management device of the server that the recording medium has been brought to the front entrance. When the library management device receives this type of notification, it transmits a draw-in operation start command to the drive device in order to cause the drive device to read/write information of the recording medium that has been temporarily evacuated at the front entrance. In this case, the evacuation destination drive device draws in the recording medium that has been temporarily evacuated at the front entrance, and, for example, an information reading operation starts.

In this type of case, the evacuation target recording medium is drawn into the drive device, and an information reading operation starts. Accordingly, in order to immediately stop this operation, the library management device needs to transmit a force termination command to the drive device. Therefore, it becomes impossible, after having transported the take-out target recording medium to a transport destination drive device, to immediately transport and return the recording medium that has been temporarily evacuated at the front entrance of the evacuation destination drive device to the original recording medium storage unit, without an effort of the administrator. Accordingly, the control origin of the library device is unable to notify the server of the completion of the take-out process of the take-out target recording medium. Consequently, the server is unable to receive notification of the completion of the take-out process of the take-out target recording medium. As a result, smooth command output becomes compromised for information reading/writing processes (such as a backup process) to be performed on the take-out target recording medium.

If the library device is a library device that can store only a single recording medium in the depth direction unlike the one that employs the deep-cell type technique, there is no need for performing control for evacuating the recording medium stored in front of the take-out target recording medium. However, this type of library device has a reduced recording medium storage location, and has disadvantages such as the maximum number of mountable recording media being reduced.

An exemplary object of the present invention is to provide a library device, a library control device, and a control method therefore, capable of solving the problem above.

Means for Solving the Problem

A library device according to an aspect of the present invention includes: a recording medium storage unit that stores at least a first recording medium, and a second recording medium that is a take-out request target; an accessor that takes out the second recording medium from the recording medium storage unit after taking out the first recording medium from the recording medium storage unit; an evacuation destination drive device that receives the first recording medium taken out by the accessor; a take-out destination drive device that draws in the second recording medium taken out by the accessor; and an operation interruption control unit that performs a control that interrupts an operation of the evacuation destination drive drawing in the second recording medium taken in the evacuation destination drive device.

A library control device according to an aspect of the present invention controls a library device including a recording medium storage unit that stores at least a first recording medium, and a second recording medium that is a take-out request target. The library control device includes: a take-out control unit that instructs an accessor to take out the second recording medium from the recording medium storage unit after taking out the first recording medium from the recording medium storage unit, the take-out control unit instructing a take-out destination drive device to draw in the first recording medium taken in the take-out destination drive device; and an operation interruption control unit that performs a control that interrupts an operation of the evacuation destination drive drawing in the second recording medium taken in the evacuation destination drive device.

A control method according an aspect of the present invention, for controlling a library device including a recording medium storage unit that stores at least a first recording medium, and a second recording medium that is a take-out request target, includes: instructing an accessor to take out the second recording medium from the recording medium storage unit after taking out the first recording medium from the recording medium storage unit; instructing a take-out destination drive device to draw in the first recording medium taken in the take-out destination drive device; and performing a control that interrupts an operation of the evacuation destination drive drawing in the second recording medium taken in the evacuation destination drive device.

Effect of the Invention

According to the present invention, the process of taking out a recording medium which is a take-out request target, can be completed normally, and information can normally be read from or written in the recording medium without any effort by the administrator.

BRIEF DESCRIPTION OF THE DRAWINGS

FIG. 5 is a diagram showing a recording medium management table stored in the library control device according to the exemplary embodiment of the present invention.

FIG. 6 is a diagram showing a drive device management table stored in the library control device according to the exemplary embodiment of the present invention.

FIG. 7 is a diagram showing a process flow of the library control device and the library management device according to the exemplary embodiment of the present invention.

EMBODIMENTS FOR CARRYING OUT THE INVENTION

Hereunder, a library device and a library control device according to exemplary embodiments of the present invention are described, with reference to the drawings.

Figure 1:
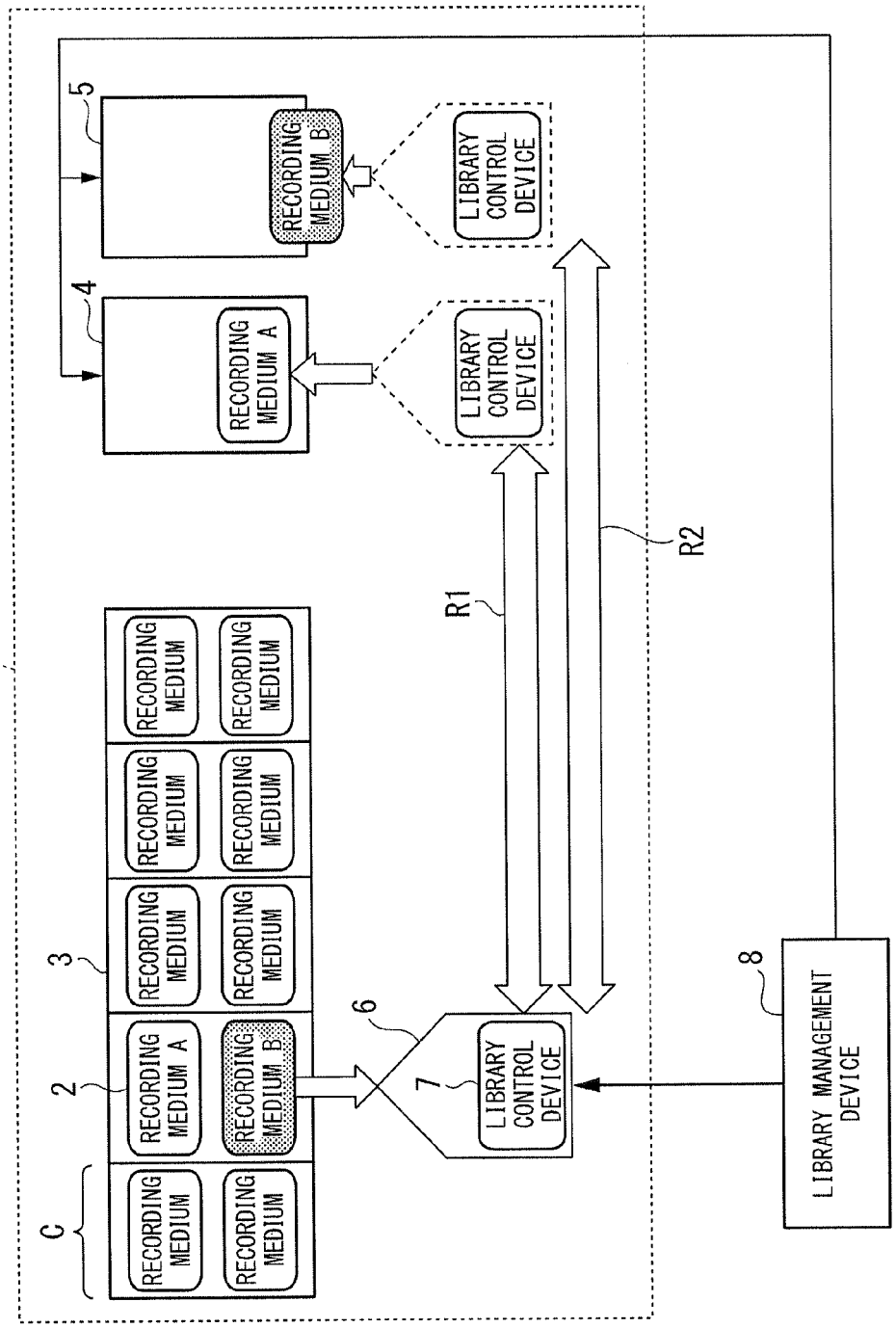
FIG. 1 is a block diagram showing a configuration of a library device according to an exemplary embodiment of the present invention.

FIG. 1 is a block diagram showing a configuration of a library device according to an exemplary embodiment of the present invention.

FIG. 1 shows an example of a case where a library device 1 according to the exemplary embodiment of the present invention is seen from above. The library device 1 includes a library 3, and drive devices 4 and 5. The library 3 stores a plurality of recording media 2. The drive devices 4 and 5 read information recorded on a recording medium 2 and write information in the recording medium 2. The library device 1 includes an accessor 6 that takes out recording media stored in the library 3 to the drive devices 4 or 5. The accessor 6 has a library control device 7 equipped therewith. The library device 1 may include configurations other than that described above.

The library 3 has a plurality of recording medium storage units that store a plurality of recording media 2 in a manner of arranging them in the depth direction from the front side to the rear side. One recording medium storage unit is referred to as cell C. In the library 3, the cells C may be provided in the up-down and left-right directions. FIG. 1 shows a state where each cell C stores two recording media 2 in the depth direction as an example, however it is not limited to this configuration. Each cell C may be configured so as to be able to store three or more recording media. The recording media 2 may be data cartridges such as tapes and disks. The recording media 2 may also be other types of recording media.

When a recording medium 2 is positioned at the front entrance of the draw-in entry by the accessor 6, the drive devices 4 and 5 detect the recording medium 2. Next, the drive devices 4 and 5 notify an external device of the detection of the recording medium 2, and draw in the recording medium 2 based on a command from the external device. In the present exemplary embodiment, an example of a case where the library device 1 includes two drive devices 2 is described, however the configuration is not limited to this. The library device 1 may include three or more drive devices.

The accessor 6 functions as a driving unit that, based on external control, takes out a recording medium 2 stored in each cell C of the library 3, and transports it to the drive device 4 or the drive device 5. Moreover, the accessor 6 functions as a driving unit that, based on external control, takes out a recording medium 2 from the drive device 4 or the drive device 5, and transports it to the library 3. In the present exemplary embodiment, an example of a case where the accessor 6 has a library control device 7 equipped therewith is described, however the configuration is not limited to this. The library control device 7 may control, via a communication line or the like, an accessor 6 that is installed at another location within the library device 1.

The arrow R1 in FIG. 1 denotes the accessor 6 transporting a recording medium 2 (A) ("recording medium A" in FIG. 1) to the drive device 4. The arrow R2 denotes the accessor 6 evacuating a recording medium 2 (B) ("recording medium B" in FIG. 1) to the drive device 5, and then returning the recording medium 2 (B) to the original position.

The library management device 8 shown in FIG. 1 is connected to the library device 1 via a communication network. The library management device 8 includes a computer server. The library management device 8 executes a preliminarily stored library management application program by means of a CPU (central processing unit). By means of functions of this application program, the library management device 8 outputs various command signals to the library control device 7 and the drive devices 4 and 5, and receives information from these devices.

Figure 2:
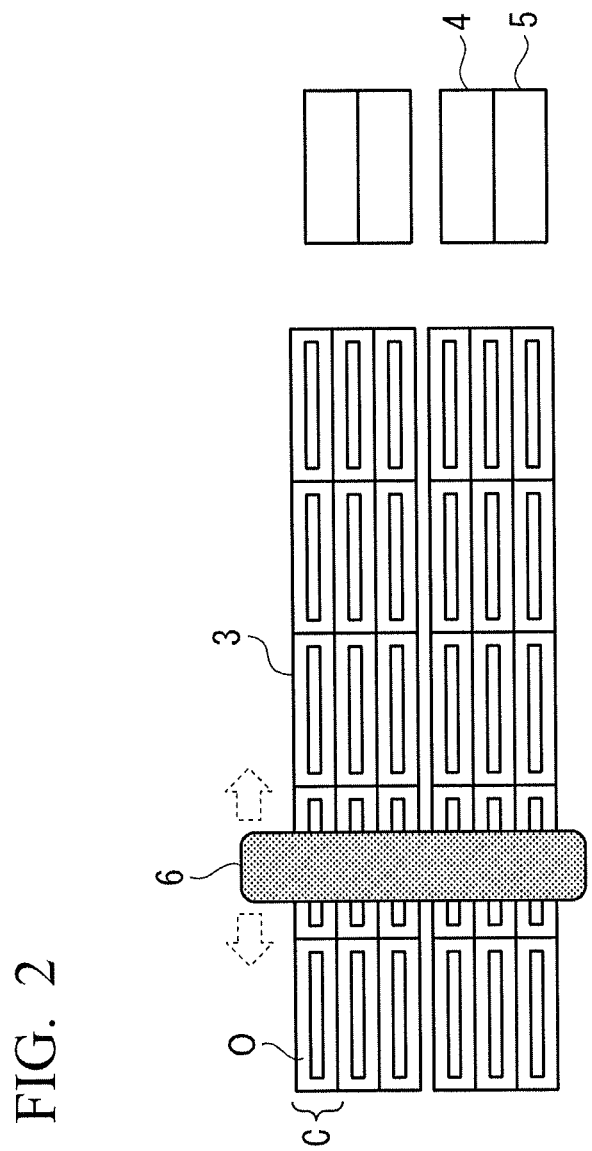
FIG. 2 is an external view of the library device according to the exemplary embodiment of the present invention.

FIG. 2 is an external view of the library device according to the exemplary embodiment of the present invention.

FIG. 2 shows an example of a case where the library device 1 is seen from the front. As shown in FIG. 2, the library 3 has a plurality of cells C arranged in the up-down and left-right directions. As shown in FIG. 2, each cell C has an opening portion O through which a recording medium 2 is discharged. As described above, each cell C stores a plurality of recording media 2 in a manner of arranging them in the depth direction of the cell C. In the present exemplary embodiment, the drive devices 4 and 5 are arranged parallel with the library 3. Moreover, in the present exemplary embodiment, the accessor 6 is installed, so as to be capable of parallel movement, at a position that enables it to take a recording medium 2 in and out of the drive devices 4 and 5 as well as the library 3. The library 3, and the drive devices 4 and 5 need not be arranged parallel with each other. It is sufficient that the accessor 6 is configured to be able to move so as to take out a recording medium according to the positions of the library 3 and the drive devices 4 and 5.

Figure 3:
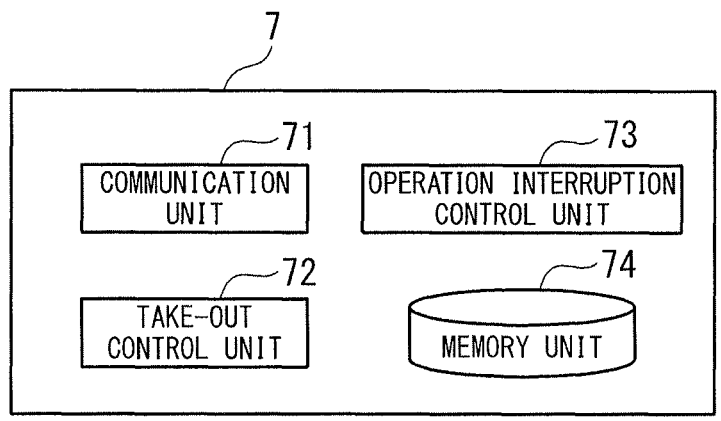
FIG. 3 is a function block diagram of a library control device according to the exemplary embodiment of the present invention.

FIG. 3 is a function block diagram of the library control device according to the exemplary embodiment of the present invention.

As shown in FIG. 3, the library control device 7 includes each function unit of a communication unit 71, a take-out control unit 72, and an operation interruption control unit 73. Moreover, the library control device 7 includes a memory unit 74.

The communication unit 71 performs communication with the library management device 8 and the drive devices 4 and 5.

Based on controls of the library management device 8, the take-out control unit 72 controls transportation of recording media 2 from the library 3 to the drive devices 4 and 5 performed by the accessor 6. Furthermore, based on controls of the library management device 8, the take-out control unit 72 controls transportation of recording media 2 from the drive devices 4 and 5 to the library 3 performed by the accessor 6.

The operation interruption control unit 73 performs a control for interrupting a draw-in operation performed by the drive devices 4 and 5.

The memory unit 74 stores information used by the library control device 7 for respective controls.

Figure 4:
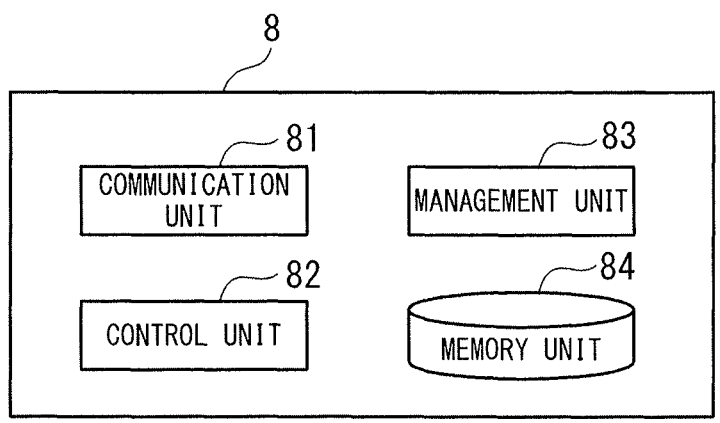
FIG. 4 is a function block diagram of a library management device according to the exemplary embodiment of the present invention.

FIG. 4 is a function block diagram of the library management device according to the exemplary embodiment of the present invention.

As shown in FIG. 4, the library management device 8 includes each function unit of a communication unit 81, a control unit 82, and a management unit 83. These functional units are realized on a computer of the library management device 8 by the computer executing a library management application program. Moreover, the library management device 8 includes a memory unit 84.

The communication unit 81 performs communication with the library control device 7 and the drive devices 4 and 5.

The control unit 82 controls each function unit of the library management device 8.

The management unit 83 (draw-in operation instruction unit) performs management processing of the library control device 7 and the drive devices 4 and 5.

The memory unit 84 stores information used by the library management device 8 for respective processes.

According to the library device of the present exemplary embodiment, when a take-out request target recording medium 2 stored in the rear among the recording media 2 stored in the library 3 is to be taken out, the take-out control unit 72 of the library control device 7 performs a control such that the recording medium 2 that is stored in front of the recording medium 2 of the take-out request target is taken out first, and it is then taken to a drive device of its evacuation destination. Then, the library control device 7 performs a control such that the take-out request target recording medium 2 is taken out to a drive device that drives the recording medium 2 for information reading/writing. Here, upon receiving a notification of detection of the recording medium 2 from the drive device, the library management device 8 performs a process to instruct the drive device to perform a draw-in operation for reading/writing information from/into the detected recording medium 2. Accordingly, in the case where the recording medium 2 has been transported to the evacuation destination drive device, the operation interruption control unit 73 of the library control device 7 performs a control for interrupting a draw-in operation to be performed on the recording medium 2 by the evacuation destination drive device.

In the present exemplary embodiment, when performing this draw-in operation interruption control, the operation interruption control unit 73 of the library control device 7 outputs to the drive device identified as an evacuation destination of the recording medium 2, a detection interruption request for the recording medium 2. When a detection interruption request has been received, the evacuation destination drive device, even in a state of having detected the recording medium 2, interrupts the detection notification of the recording medium 2 to the library management device 8. Thereby, the library management device 8 instructs the evacuation destination drive device to interrupt the draw-in operation of the recording medium 2. At this time, even when the recording medium 2 is positioned at the front entrance of the draw-in entry of the evacuation destination drive device and the recording medium 2 has been detected, the draw-in operation is not performed. Therefore, the accessor 6 can, after having transported the take-out request target recording medium 2 to the take-out destination drive device (driving drive device), take out the evacuated recording medium 2 and transport it to the original cell C of the library 3. As a result, the take-out process of the take-out request target recording medium 2 is completed normally. In this case, the evacuated recording medium will not be drawn into the drive device, and hence there is no need for the administrator to perform an operation for forced termination, which is performed after the medium has been drawn in. Therefore, information reading/writing on the recording medium 2, which is a take-out request target, can be completed normally without delays and without any effort being made by the administrator.

FIG. 5 is a diagram showing a recording medium management table stored in the library control device according to the exemplary embodiment of the present invention.

The memory unit 74 of the library control device 7 stores a recording medium management table 741. As shown in FIG. 5, the recording medium management table 741 stores identification information of recording media 2 while associating the identification number of each cell C (cell C (1) through C (3)) with storage position information indicating the "front" position and the "rear" position of each cell C.

The library control device 7 reads information of the recording medium management table 741. Thereby, the library control device 7 can detect, for example, a recording medium 2 (13) being stored in the front position of the cell C (2) and a recording media 2 (A) being stored in the rear position of the cell C (2).

The recording medium management table 741 may be stored in the memory unit 84 of the library management device 8.

FIG. 6 is a diagram showing a drive device management table stored in the library control device according to the exemplary embodiment of the present invention.

The memory unit 74 of the library control device 7 stores a drive device management table 742. As shown in FIG. 6, the drive device management table 742 stores information indicating usage status of the drive devices 4 and 5 while associating them with identification information thereof. For a drive device that is associated with information indicating the not-in-use status, the library control device 7 determines that transportation of a recording medium 2 to this drive device is possible. For a drive device that is associated with information indicating the in-use status in the drive device management table 742, the library control device 7 determines that transportation of a recording medium 2 to this drive device is not possible. In the case where information indicating the in-use status of a drive device is recorded in the drive device management table 742, the identification information of the recording medium 2 that has been taken out to this drive device may be associated with the identification information of the drive device and recorded as recording medium identification information.

The drive device management table 742 may be stored in the memory unit 84 of the library management device 8.

Next, details of a process flow of the library control device 7 and the library management device 8 according to the exemplary embodiment of the present invention are described sequentially, with reference to FIG. 7.

First, based for example on a backup command or the like, the management unit 83 of the library management device 8 detects that a process of backing up information stored in a recording medium 2 is to be performed. Moreover, the management unit 83 detects the identification information of the recording medium 2, which is the target of the take-out command to a drive device, for the backup process. Here, it is assumed that the take-out request target recording medium 2 is a recording medium 2 (A). The management unit 83 transmits a take-out command that includes the identification information of the recording medium 2 (A) to the library control device 7 via the communication unit 81 (step S101). The take-out command may include the identification information of the take-out destination drive device determined by the management unit 83. Alternatively, the take-out control unit 72 of the library control device 7 may identify a take-out destination drive device among the drive devices that are associated with information from the drive device management table 742 indicating the not-in-use status.

Upon receiving the take-out command via the communication unit 71, the take-out control unit 72 of the library control device 7 reads the identification information of the recording medium 2 (A) from the take-out command, and detects the recording medium 2 (A) as being a take-out request target. Then, the take-out control unit 72 reads, from the recording medium management table 741 stored in the memory unit 74, storage position information recorded in and associated with the identification information of the recording medium 2, which is the take-out request target. The take-out control unit 72 performs a take-out process for the take-out request target recording medium 2 based on the read storage position information. At this time, the take-out control unit 72 determines whether or not to perform an evacuation process (step S102). Specifically, the take-out control unit 72 determines not to perform an evacuation process if the read storage position information indicates the front position. On the other hand, the take-out control unit 72 determines to perform an evacuation process if the read storage position information indicates the rear position.

Since the take-out request target recording medium 2 is assumed to be a recording medium 2 (A), the take-out control unit 72 reads, from the recording medium management table, the "rear position" information, which is the recorded storage position information associated with the recording medium 2 (A). As a result, the take-out control unit 72 determines to perform an evacuation process. When performing the evacuation process, the take-out control unit 72 first identifies the drive device that is going to be the evacuation destination of the recording medium 2 stored in the front position of the recording medium 2 (A). In the case of performing an evacuation destination drive device detection process, the take-out control unit 72 reads the identification information of the take-out destination drive device from the take-out command. Then, the take-out control unit 72 identifies, from the drive device management table 742, whether a drive device that is not in use is present among the drive devices other than the take-out destination drive device. The take-out command is assumed to include identification information of the "drive device 4" as the identification of the take-out destination drive device. In this case, the take-out control unit 72 reads the identification information of the drive devices that are associated with identification information of drive devices other than the drive device 4, and that have information indicating the not-in-use status (not in use) recorded therefor (such as drive device 5). For example, the take-out control unit 72 identifies the identification information of the drive device 5, which is one of the read identification information, as the identification information of the evacuation destination drive device. The take-out control unit 72 then notifies the operation interruption control unit 73 of the identification information of the identified drive device. Then, based on the identification information of the evacuation destination drive device, the operation interruption control unit 73 reads the communication address of the evacuation destination drive device from the memory unit 74. The operation interruption control unit 73 transmits to the communication address a "medium absent status request (detection interruption request)" (step S103).

In the present exemplary embodiment, there has been an example of a case where the memory unit 74 of the library control device 7 stores a drive device management table 742. However, the memory unit 84 of the library management device 8 may store the drive device management table 742. In this case, the management unit 83 of the library management device 8 may identify the evacuation destination drive device 5 by means of a process similar to the process described above, and may notify the library control device 7.

The drive device 4 or the drive device 5 normally, in the case where a recording medium 2 is positioned at the front entrance of the draw-in entry thereof and is detected by a sensor, outputs a signal that indicates "medium present (that a recording medium is present)", in response to polling from the library management device 8. As a result, the management unit 83 of the library management device 8 outputs, to the drive device 4 or the drive device 5 that output the signal indicating "medium present", a signal that instructs a draw-in operation for information reading/writing to be performed on the recording medium 2. The drive device 4 or the drive device 5 that received this signal performs an operation to draw in the recording medium 2 positioned at the front entrance. However, in the present exemplary embodiment, the drive device 5 has received a "medium absent status request". Accordingly, the drive device 5, even if a recording medium 2 is positioned at the front entrance of the draw-in entry thereof and is detected, does not output a signal that indicates "medium present" in response to polling from the library management device 8, and sets the status so that a "medium absent" indication signal is output (step S104). Therefore, the drive device 5 outputs a "medium absent" indication signal in response to polling from the library management device 8. Thereby the management unit 83 of the library management device 8 does not output, to the drive device 5, a signal that instructs a draw-in operation. As a result, the drive device 5 does not perform the operation of drawing in the recording medium 2. Upon completion of status setting, the drive device 5 transmits to the library control device 7, a signal that indicates the status setting completion (step S105).

After the operation interruption control unit 73 has transmitted the "medium absent status request", as an evacuation process, the take-out control unit 72 reads from the recording medium management table 741 the identification information of the recording medium 2 that is stored in the front position of the recording medium 2 (A) that is the take-out request target. Here, the identification information of the recording medium 2 stored in the front position of the recording medium 2 (A) is recording medium 2 (B). Therefore, the take-out control unit 72 identifies the recording medium 2 (B) stored in the front position of the recording medium 2 (A) that is the take-out request target, as being the evacuation target recording medium 2. The take-out control unit 72 reads identification information "cell C (2)" of the cell that is recorded in the recording medium management table 741 while being associated with the identification information of the evacuation target recording medium 2 (B). The take-out control unit 72 then identifies the cell C (2) as being the identification information of the cell in which the recording medium 2 (B) is stored.

The take-out control unit 72 outputs to the accessor 6, a discharge control signal that includes: the identification information "cell C (2)" of the cell in which the evacuation target recording medium 2 (B) is stored; the storage position information "front"; and the identification information of the evacuation destination drive device 5 (step S106). Based on the cell identification information "cell C (2)" and the storage position information "front", the accessor 6 performs an operation of taking out the recording medium 2 (B) to the evacuation destination drive device 5. Specifically, (the driving unit of) the accessor 6 that takes out the recording medium 2 takes out the recording medium 2 (B) from the front storage position of the cell C (2), then drives on the rail on the front side of the library 3 to make parallel movement, and stops in front of the drive device 5. Furthermore, the accessor 6 moves the recording medium 2 (B) in the up-down direction to the height of the front entrance of the drive device 5, and positions it at the front entrance. As a result, the recording medium 2 (B) stored at the front position of the take-out request target recording medium 2 (A) is positioned at the front entrance of the evacuation destination drive device 5. Then, the accessor 6 transmits an evacuation completion indication signal to the library control device 7.

The take-out control unit 72 of the library control device 7 receives the signal that indicates the evacuation completion (step S107). Consequently, the take-out control unit 72 removes information of the recording medium 2 (B) that is recorded in the recording medium management table 741. Furthermore, the take-out control unit 72 records the identification information of the recording medium 2 (B) in the drive device management table 742 while associating it with the identification information of the drive device 5. The take-out control unit 72 may record, in a memory or the like, the identification information and storage position information of the original cell from which the recording medium 2 (B) is to be taken out and in which it was stored. Alternatively, the take-out control unit 72, instead of the identification information of the recording medium 2 (B) recorded in the recording medium management table 741, may record information that indicates the original storage position of the recording medium 2 (B), in a record position of the recording medium management table 741.

The recording medium management table 741 may be recorded in the memory unit 84 of the library management device 8. In this case, the management unit 83 of the library management device 8 may identify the evacuation target recording medium 2 (B), may detect the cell or storage position where the recording medium 2 (B) is stored, and may notify it to the library control device 7.

Next, based on the take-out command received from the library management device 8, the take-out control unit 72 of the library control device 7 that has received the evacuation completion indication signal reads the identification information of the take-out request target recording medium 2 (A) and the identification information of the take-out destination drive device 4. Alternatively, the take-out control unit 72 may identify the take-out destination drive device 4 by means of a predetermined process. The take-out control unit 72 then reads the identification information "cell C (2)" of the cell that is recorded in the recording medium management table while being associated with the identification information of the take-out request target recording medium 2 (A), and identifies the cell C (2) as being the identification information of the cell in which the recording medium 2 (A) is stored.

The take-out control unit 72 outputs to the accessor 6, a discharge control signal that includes: the identification information "cell C (2)" of the cell in which the take-out request target recording medium 2 (A) is stored; the storage position information "rear"; and the identification information of the take-out destination drive device 4 (step S108). Consequently, based on the cell identification information "cell C (2)" and the storage position information "rear", the accessor 6 performs an operation of taking out the recording medium 2 (A) to the take-out destination drive device 4. Specifically, the accessor 6 takes out the recording medium 2 (A) from the rear storage position of the cell C (2), drives on the rail on the front side of the library 3 to make parallel movement, and stops in front of the drive device 4. Furthermore, the accessor 6 moves the recording medium 2 (A) in the up-down direction to the height of the front entrance of the drive device 4, and positions it at the front entrance. As a result, the take-out request target recording medium 2 (A) is positioned at the front entrance of the take-out destination drive device 4.

Here, the operation interruption control unit 73 of the library control device 7 does not transmit a "medium absent status request" to the drive device 4. Therefore, when the recording medium 2 (A) positioned at the front entrance has been detected by a sensor, the drive device 4 outputs a "medium present" indication signal in response to polling from the library management device 8 (step S109). The management unit 83 of the library management device 8 receives the signal indicating "medium present". In response to the reception of this signal, the management unit 83 outputs to the library control device 7, a signal that instructs a draw-in operation for information reading/writing to be performed on the recording medium 2 (A) that is discharged to the drive device 4 (step S110). In response to the reception of this signal, the take-out control unit 72 of the library control device 7 outputs to the drive device 4, a signal that instructs a draw-in operation (step S111). In response to the reception of this signal, the drive device 4 performs an operation to draw in the recording medium 2 (A) positioned at the front entrance.

Then, the drive device 4 transmits to the library control device 7, a signal that indicates the draw-in completion of the recording medium 2 (A) (step S112). The take-out control unit 72 of the library control device 7 receives the signal that indicates the draw-in completion (step S113).

Moreover, the library control device 7 notifies the library management device 8 of the signal that indicates the draw-in completion of the recording medium 2 (A). As a result, the management unit 83 of the library management device 8 detects that the drive device 4 has completed the draw-in operation for the recording medium 2 (A). In response to this, take-out control unit 72 of the library control device 7 removes the identification information of the recording medium 2 (A) from the recording medium management table 741. Furthermore, the take-out control unit 72 records the identification information of the recording medium 2 (A) in the drive device management table 742 while associating it with the identification information of the drive device 4.

Then, the take-out control unit 72 performs a control for returning the recording medium 2 (B), which has temporarily been evacuated, to the original storage position. Specifically, based on the identification information of the recording medium 2 (B), the take-out control unit 72 reads, from the drive device management table 742 or the memory, the identification information of the drive device 5 in which the evacuated recording medium 2 (B) is positioned. As a result, as the original storage location of the recording medium 2 (B), the take-out control unit 72 reads the cell identification information "cell C (2)" and the storage position information "front". The take-out control unit 72 outputs to the accessor 6, a discharge control signal that includes: the identification information of the recording medium 2 (B); the identification information "cell C (2)" of the cell, which is the original storage location of the recording medium 2 (B); and the storage position information "front" (step S114).

Based on the cell identification information "cell C (2)" and the storage position information "front", the accessor 6 performs an operation of taking out the recording medium 2 (B) to the storage location of the library 3, from which it was originally taken out. Specifically, the accessor 6 takes out the recording medium 2 (B) from the front entrance of the drive device 5, then moves parallelly on the rail on the front side of the library 3, and stops in front of the cell C (2) in the library 3. Furthermore, the accessor 6 stores the recording medium 2 (B) in the front storage position of the cell C (2). As a result, the evacuation target recording medium 2 (B) has been moved to the front storage location of the cell C (2), from which it was originally taken out.

Having moved the evacuation target recording medium 2 (B) to its original storage location, the take-out control unit 72 transmits a "status release request" to the drive device 5 that has been identified as an evacuation destination (step S115). As a result, the drive device 5 releases the status change based on the "medium absent status request". Then, the drive device 5 transmits to the library control device 7, a signal that indicates the status release completion (step S116). Accordingly, in response to polling from the library management device 8, the drive device 5 transmits "medium present" information if a recording medium 2 is present at the front entrance.

If take-out control unit 72 determines in step S102 that the evacuation process is not performed, it performs the normal take-out process described below (step S117). That is to say, if the storage position of the take-out request target recording medium 2 is "front", the take-out control unit 72 reads the identification information of the take-out request target recording medium 2 and the identification information of the take-out destination drive device based on the take-out command received from the library management device 8. As an alternative method, the take-out control unit 72 may identify the take-out destination drive device 4 based on a predetermined process. The take-out control unit 72 reads the identification information of the cell that is recorded in the recording medium management table while being associated with the identification information of the take-out request target recording medium 2. The take-out control unit 72 then identifies the cell which has been read as being the identification information of the cell in which the take-out request target recording medium 2 is stored.

The take-out control unit 72 outputs to the accessor 6, a discharge control signal that includes: the identification information of the cell in which the take-out request target recording medium 2 is stored; the storage position information "front"; and the identification information of the take-out destination drive device. The accessor 6 receives the discharge control signal, and performs an operation of taking out the take-out request target recording medium 2 to the take-out destination drive device, using the cell identification information and the storage position information "front". Specifically, the accessor 6 takes out the take-out request target recording medium 2 from the front storage position of the cell C, and positions it at the front entrance of the take-out destination drive device.

Here, the take-out control unit 72 of the library control device 7 does not transmit a "medium absent status request" to the take-out destination drive device. Therefore, the take-out destination drive device, if the take-out request target recording medium 2 positioned at the front entrance has been detected by the sensor, transmits a "medium present" indication signal in response to polling from the library management device 8. Upon receiving the signal indicating "medium present", the management unit 83 of the library management device 8 transmits to the take-out destination drive device, a signal that instructs a draw-in operation for reading/writing information from/into the take-out request target recording medium 2. The drive device that receives this signal performs the operation to draw in the recording medium 2 positioned at the front entrance.

The take-out destination drive device transmits to the library control device 7, a signal that indicates the draw-in completion of the take-out request target recording medium 2. Moreover, the take-out control unit 72 of the library control device 7 notifies the library management device 8 of the signal that indicates the draw-in completion of the take-out request target recording medium 2. As a result, the management unit 83 of the library management device 8 detects the completion of the draw-in operation of the take-out request target recording medium 2 performed by the take-out destination drive device. The take-out control unit 72 of the library control device 7 that has detected the completion of the draw-in operation of the take-out request target recording medium 2, removes the identification information of the recording medium 2 from the recording medium management table 741. Furthermore, the take-out control unit 72 records the identification information of the take-out request target recording medium 2 in the drive device management table 742 while associating it with the identification information of the take-out destination drive device.

The above is a description of the library device and library control device according to the exemplary embodiment of the present invention. According to this type of library device and library control device, when performing a draw-in operation interruption control, the operation interruption control unit 73 of the library control device 7 outputs, to the drive device used as an evacuation destination of the recording medium 2, a detection interruption request for the recording medium 2. When a detection interruption request has been received, the evacuation destination drive device, even in a state of having detected the recording medium 2, interrupts the detection notification of the recording medium 2 to the library management device 8. Accordingly, the library management device 8 does not instruct an operation of drawing the recording medium 2 into the evacuation destination drive device. Therefore, even when the recording medium 2 is positioned at the front entrance of the draw-in entry and this recording medium 2 has been detected, the evacuation destination drive device does not perform the draw-in operation. Therefore, the accessor 6 can, after having transported the take-out request target recording medium 2 to the take-out destination drive device, take out the evacuated recording medium 2 and transport it to the original cell C of the library 3. As a result, the take-out process of the take-out request target recording medium 2 is completed normally. Moreover, information reading/writing on this recording medium 2 can be completed normally without any effort being made by the administrator.

Furthermore, it is possible, without changing the library to one with a library structure that allows only a single recording medium to be stored in the depth direction, to provide a library device 1 with a mechanism in which the evacuated drive device will not be drawn in. As a result, the user can operate the library device 1 without making any effort.

In the above description, there has been described an example of the case where, in performing the control of interrupting the draw-in operation, the library control device 7 transmits a "medium absent status request (detection interruption request)" to the drive device, and this drive device changes the information recorded as a status, to "medium absent". However, the configuration is not limited to this. The driver device may perform a control to lower the sensitivity level of the sensor for recording medium detection, based on reception of a "medium absent status request (detection interruption request)". For example, electric power supply to the sensor that detects a recording medium being placed at the front entrance may be cut off by means of a switching circuit or the like. In the case where the sensor detects a recording medium using the reflection of light emitted to the recording medium, there may be performed a control of stopping the light emission or lowering the light intensity. Accordingly, the drive device becomes unable to detect recording media, and no longer transmits "medium present" in response to polling from the library management device 8. In addition, the drive device may perform any type of control as long as the control eliminates transmission of "medium present" in response to polling from the library management device 8, based on a detection interruption request such as "medium absent status request". For example, it may be considered that the drive device moves the recording medium placed at the front entrance, to a position where it structurally cannot be detected by the sensor, or signals from the sensor are interrupted.

As described above, in the library device 1 according to the exemplary embodiment of the present invention, for example, the cell C stores at least the recording medium 2 (B) (first recording medium), and the recording medium 2 (A) (second recording medium) that is a take-out request target. The accessor 6 takes out the recording medium 2 (A) from the cell C after taking out the recording medium 2 (B) from the cell C. The drive device 5 (evacuation destination drive device) receives the recording medium 2 (B) taken out by the accessor 6. The drive device 4 (take-out destination drive device) draws in the recording medium 2 (A) taken out by the accessor 6. The operation interruption control unit 74 performs a control that interrupts an operation of the drive device 5 drawing in the recording medium 2 (A) taken in the drive device 5.

The opening portion O of the cell C discharges the recording media 2 (A) and 2 (B). The cell C stores the recording medium 2 (A) in the rear of the recording medium 2 (B) with respect to the opening portion O.

The operation interruption control unit 72 instructs the drive device 5 to output, as a response to polling, a signal indicating that a recording medium is not taken in. In a state of receiving the recording medium 2 (B), the drive device 5 outputs, as a response to polling, a signal indicating that a recording medium is not taken in.

The accessor 6 takes out the recording medium 2(B) from the drive device 5 after the drive device 5 receives the recording medium 2 (B) and before the drive device 5 draws in the recording medium 2(B).

The accessor 6 takes out the recording medium 2 (B) from the take-out drive device after the drive device 4 draws in the recording medium 2 (A) and before the drive device 5 draws in the recording medium 2 (B).

The respective devices in the above description may have a computer system internally. The steps of the respective processes described above may be stored in a program format on a computer-readable recording medium, and the processes may be performed by a computer reading and executing this program. Examples of computer-readable recording medium include magnetic disk, magnetic optical disk, CD-ROM, DVD-ROM, and semiconductor memory. This computer program may be distributed through a communication line, and another computer that received this distribution may execute the program.

The above program may realize part of the functions described above.

It may be a so-called difference file (difference program), which can realize the functions described above in combination with a program that is preliminarily recorded on the computer system.

While the invention has been shown and described with reference to exemplary embodiments thereof, the invention is not limited to these embodiments. It will be understood by those of ordinary skill in the art that various changes in form and details may be made therein without departing from the scope of the present invention as defined by the claims.

This application is based upon and claims the benefit of priority from Japanese patent application No. 2012-172707, filed on Aug. 3, 2012, the disclosure of which is incorporated herein in its entirety by reference.

INDUSTRIAL APPLICABILITY

The present invention may be applied to a library device, a control method therefor, and a library control device. By application of the present invention, the process of taking out a recording medium, which is a take-out request target, can be completed normally, and information can normally be read from or written in the recording medium without any effort by the administrator.

REFERENCE SYMBOLS

1 Library device
2 Recording medium
3 Library
4, 5 Drive device
6 Accessor
7 Library control device 8 Library management device
71, 81 Communication unit
72 Take-out control unit
73 Operation interruption control unit
74, 84 Memory unit
82 Control unit
83 Management unit

The invention claimed is:

1. A library device comprising:
   a recording medium storage configured to store at least a first recording medium and a second recording medium, wherein the second recording medium is a take-out request target;
   an accessor configured to take out the second recording medium from the recording medium storage after taking out the first recording medium from the recording medium storage;
   an evacuation destination drive device configured to receive the first recording medium taken out by the accessor;
   a take-out destination drive device configured to draw in the second recording medium taken out by the accessor; and
   an operation interruption controller configured to perform an interruption control to interrupt an operation of the evacuation destination drive drawing in the first recording medium taken in the evacuation destination drive device.

2. The library device according to claim 1, wherein
   the operation interruption controller is further configured to output, to the evacuation destination drive device, a detection interruption request for a recording medium, and
   when the evacuation destination drive device receives the detection interruption request, the evacuation destination drive device is further configured to interrupt a recording medium detection notification to a library management device in a state of detecting the first recording medium.

3. The library device according to claim 1, further comprising:
   a take-out controller configured to instruct the accessor to take out to the recording medium storage the first recording medium taken out to the evacuation destination drive device when the take-out control unit detects completion of taking out the second recording medium being the take-out request target.

4. The library device according to claim 1, wherein the operation interruption controller is further configured to release the interruption control when the operation interruption controller detects completion of taking out to the recording medium storage the first recording medium taken out to the evacuation destination drive device.

5. The library device according to claim 1, wherein the recording medium storage comprises an opening portion configured to discharge the first recording medium and the second recording medium and stores the second recording medium in rear of the first recording medium with respect to the opening portion.

6. The library device according to claim 1, wherein
   the operation interruption controller is further configured to instruct the evacuation destination drive device to output, in response to polling, a signal indicating that a recording medium is not taken in, and
   in a state of receiving the first recording medium, the evacuation destination drive device is further configured to output in response to polling, a signal indicating that a recording medium is not taken in.

7. The library device according to claim 1, wherein the accessor is further configured to take out the first recording medium from the take-out destination drive device after the evacuation destination drive device receives the first recording medium and before the evacuation destination drive device draws in the first recording medium.

8. The library device according to claim 1, wherein the accessor is further configured to take out the first recording medium from the evacuation destination drive device after the take-out destination drive device draws in the second recording medium and before the evacuation destination drive device draws in the first recording medium.

9. A library control device for controlling a library device, the library device including a recording medium storage storing at least a first recording medium and a second recording medium being a take-out request target, the library control device comprising:
   a take-out controller configured to instruct an accessor to take out the second recording medium from the recording medium storage after taking out the first recording medium from the recording medium storage, the take-out controller instructing a take-out destination drive device to draw in the second recording medium taken in the take-out destination drive device; and
   an operation interruption controller configured to perform an interruption control to interrupt an operation of an evacuation destination drive device drawing in the first recording medium taken in the evacuation destination drive device.

10. A control method for controlling a library device, the library device including a recording medium storage storing at least a first recording medium and a second recording medium being a take-out request target, the control method comprising:
    instructing an accessor to take out the second recording medium from the recording medium storage after taking out the first recording medium from the recording medium storage;
    instructing a take-out destination drive device to draw in the second recording medium taken in the take-out destination drive device; and
    performing an interruption control to interrupt an operation of an evacuation destination drive device drawing in the first recording medium taken in the evacuation destination drive device.

* * * * *